March 14, 1967

J. V. FITZGERALD 3,308,650

ACOUSTIC SPECTROMETER

Filed May 17, 1963

INVENTOR.
JOHN VINCENT FITZGERALD

BY

ATTORNEYS

Resonance amplitude and internal friction plotted as function of temperature

March 14, 1967 J. V. FITZGERALD 3,308,650
ACOUSTIC SPECTROMETER

Filed May 17, 1963 5 Sheets-Sheet 4

INVENTOR.
JOHN VINCENT FITZGERALD
BY
Morgan, Finnegan, Durham & Pine
ATTORNEYS

United States Patent Office 3,308,650
Patented Mar. 14, 1967

3,308,650
ACOUSTIC SPECTROMETER
John V. Fitzgerald, 106 Norris Ave.,
Metuchen, N.J. 08840
Filed May 17, 1963, Ser. No. 281,308
13 Claims. (Cl. 73—67.2)

This invention relates to instrumentation for the analysis of solid materials in which such materials are subjected to variable, controlled acoustic energy and other parameters such as temperature, with the vibrational response of the material detected to determine various factors descriptive of the internal structure of the material including Q factor, internal friction or dissipation, resonant frequency, modulus of elasticity and related characteristics.

The vibrational response of solid materials of a given configuration to applied thermal and vibratory energy in the acoustic spectrum depends inter alia on the internal friction of the specimen. The internal friction or dissipation is frequently expressed in terms of the reciprocal of $Q, (1/Q)$, where $Q$ is a so-called quality factor or resonance amplification factor. The quality factor $Q$ or its reciprocal is frequency and temperature dependent, is different for different materials, and has received, particularly in the past several decades, increasing attention by investigators. It has been determined, for example, that $Q$ varies widely with composition as the following Table I shows:

TABLE I

| Material: | Q |
|---|---|
| Fused silica | 5000 |
| Steel | 2700 |
| Glass | 500 |
| Brick | 320 |
| Concrete | 150 |
| Wood | 50 |
| Cork | 5 |
| Rubber | 3 |
| Plastic | 2 |

It has also been shown that the Q of a particular specimen depends on the temperature thereof. Table II illustrates approximate values of Q at different temperatures for a specimen of glass.

TABLE II

| Temp. (° C.): | Q |
|---|---|
| 40 | 1250 |
| 60 | 1030 |
| 100 | 720 |
| 150 | 570 |
| 200 | 700 |

Of particular interest is the Q of various solid materials under acoustic conditions where the material exhibits resonance phenomena similar in certain respects to the resonant or anti-resonant characteristic of electrical R, L, C circuits. Q under these conditions may be defined as $$Q = \frac{\sqrt{3}fr}{f_2 - f_1} \quad (1)$$

where $fr$ is the freqency of resonance, and $f_1$ and $f_2$ are the half-amplitude frequencies. High Q materials are thus those that exhibit sharp resonance features characterized by high amplitude and narrow bandwidth. Lower Q materials, which have greater internal friction or dissipation, have relatively lower amplitude and wider bandwidth.

In addition to being defined by bandwidth-amplitude characteristics, Q or its reciprocal 1/Q may also be expressed in several other ways. For example, $$1/Q = \frac{1}{2\pi} \frac{\Delta \omega}{\omega} \quad (2)$$

where $\omega$ is the vvibrational energy and $\Delta \omega$ the energy loss per cycle. $\Delta \omega / \omega$ is the specific damping capacity.

The percentage decrease per cycle in vibrational energy, that is, the engineering damping capaicty, $d$, is related to the foregoing.

$$d = 200\pi/Q \quad (3)$$

Q may also be related to the resultant rate of amplitude decay manifest in the damped wave train. In terms of $\delta$, the natural logarithm of the ratio of successive amplitudes, i.e., the logarithmic decrement, $$Q = \pi/\delta \quad (4)$$

Q may also be defined in terms of (1) the loss angle $\Phi$, i.e., the phase angle between the driving force and resultant displacement, (2) in terms of the ratio of sample reactance and resistance, and (3) also in terms of the ratio of resonance amplitude $A_r$ to static deflection, $a'$. Thus, $$Q = \frac{A_r}{a'} \quad (5)$$

Since $$a' = \frac{P}{E} \quad (6)$$

where P is the static load and E is Young's modulus of elasticity, then, $$Q = \frac{A_r E}{P} \quad (7)$$

In addition to variations in $A_r$ with temperature, the modulus E will also vary with temperature. Modulus E determines the resonant frequency $fr$ subject, to a lesser extent, to thermal dimensional changes in the sample; (relations between elastic moduli for rigidity, compression, and flexure, and specimen dimensions are provided in the applicable handbooks). The effect of temperature on resonant frequency is illustrated in Table III for a specimen of glass.

TABLE III

| Temp. (° C.): | Resonant freq. (c.p.s.) |
|---|---|
| 50 | 3668 |
| 80 | 3671 |
| 150 | 3674 |
| 200 | 3676 |
| 250 | 3679 |

With respect to vibrational amplitude of the specimen it has also been determined that the amplitude at resonance, $A_r$, for a given driving amplitude, is related to Q, being in certain cases proportional to Q.

The foregoing relationships and characteristics in acoustic absorption spectra have received increasing attention as parameters and criteria for evaluating and/or controlling various factors and phenomena relating to solids including:

(1) Material composition
(2) Reaction rates
(3) Diffusion
(4) Grain size
(5) Thermal history
(6) Elastic modulus
(7) Viscous flow
(8) Fatigue
(9) Cold work (dislocations)
(10) Effects of moisture
(11) Ferromagnetic effects The concept of relaxation time $\tau$ is helpful to the understanding of the acoustic absorption spectrum. The amplitude diminishes to the fraction $1/\epsilon$ of its original value in time $\tau$. Thus $\tau = T/\pi\delta$ where T is the time necessary to perform one cycle and $\delta$ is the logarithmic decrement. For a very great many of the micro processes in solids which cause internal friction—such as atomic diffusion, precipitation, intergranular viscosity and phase transformation—it has been shown both theoretically and experimentally that the function $Q^{-1}=F(f\tau)$ holds in the Arrhenius equation $\tau=\tau_0 e H/RT$. Thus H may be obtained by making measurements at two frequencies. Then the transformation of frequency for temperature ($1nf$ for $1/T$) may readily be made and a relaxation spectrum or acoustic absorption spectrum as a function of frequency can be constructed. Each micro-process or phenomena, and there may be several for any given solid over several hundreds of degrees centigrade, will have its own activation heat. The long established validity of the Arrhenius equation for many of the phenomena encountered in this field of investigation justifies references to the acoustic spectrum even though the abscissa in plots of data may be the temperature.

Thus acoustic spectrometry constitutes a promising technique. However, instrumentation and methods heretofore proposed or practised have been so complex and laborious as to discourage effective exploitation. In some instances several man-years of tedious calibration, adjustment and point-by-point plotting are required to investigate the acoustic spectrum of a single material. Expensive and elaborate equipment have discouraged those with limited resources; instrumental and procedural complexity have constituted a serious obstacle to those investigators not skilled in electronics.

It is accordingly one object of the invention to provide improved apparatus for acoustic spectrometry. Additional objects of the invention are to provide a simply constructed, easily operated and rapidly functioning acoustic spectrometer which yields a wide variety of data in an automatic manner.

These and other objects and advantages of the invention, such as improvements in data mixing, data display and monitoring, will be set forth in part hereinafter and in part will be obvious herefrom, or may be learned by practise with the invention, the same being realized and attained by means of the instrumentalities, combinations and improvements pointed out in the appended claims.

The invention consists in the novel parts, constructions, arrangements, combinations and improvements herein shown and described.

Serving to illustrate an exemplary embodiment of the invention as well as explanatory materials related thereto are the drawings of which:

Figure 1:
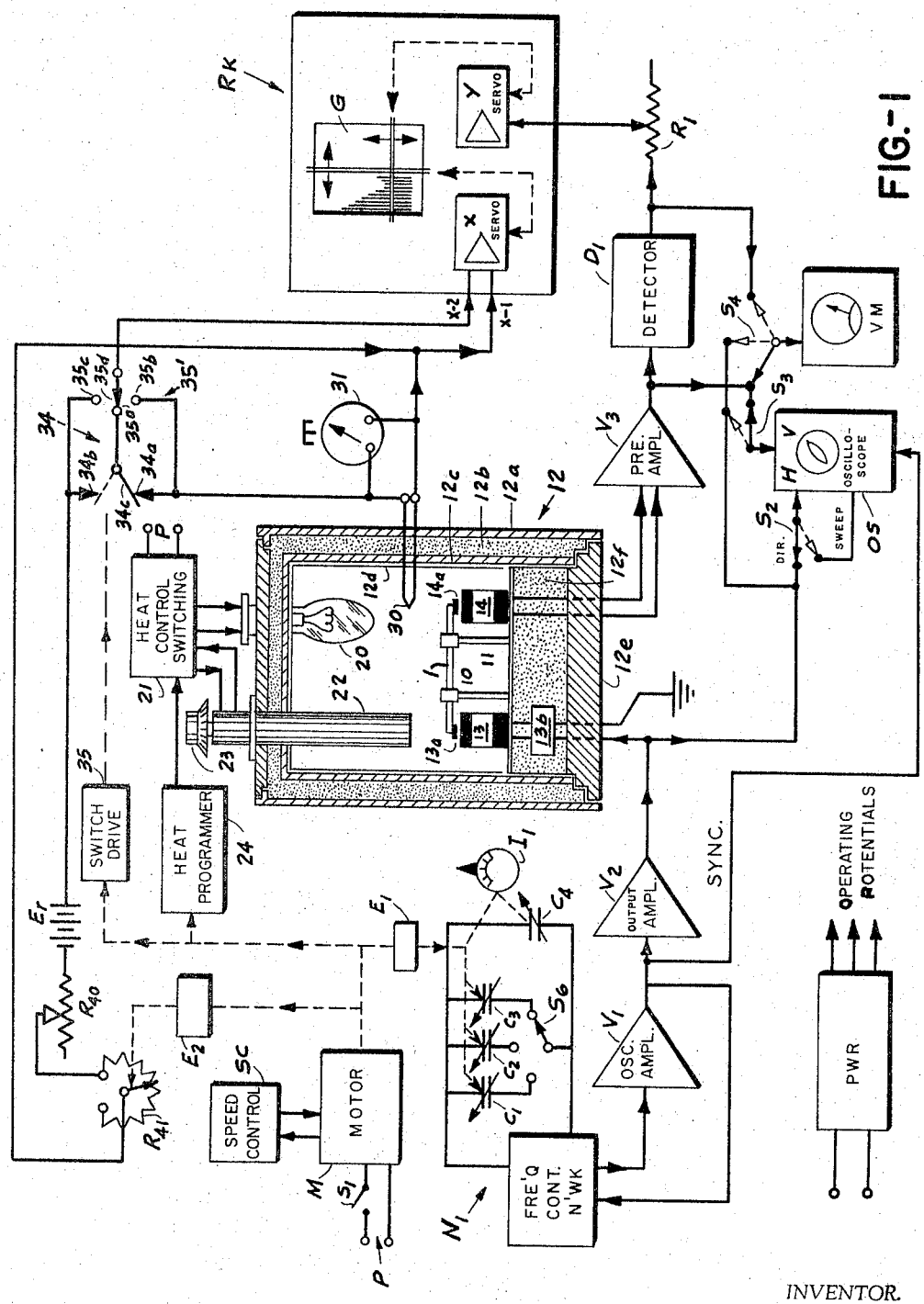
FIGURE 1 is a schematic diagram of one system embodiment according to the invention.

The system according to the invention as illustrated in FIGURE 1, is adapted to test specimens of solids such as 1 which are mounted at the specimen nodes on supports 10, 11 in a thermally controlled enclosure 12. The latter is heated from a radiant heat source embodied here as an incandescent lamp 20. The heat source may be controlled by a heat control switching circuit 21, and a thermostatic controller 22 having one end inserted into the enclosure with a control 23 on its opposite, external end which may be manually or motor driven. Controller 22 may illustratively comprise a thermostatic switch connected via switching control 21, between a power source and lamp 20; control 23 conveniently adjusts the thermal response of the thermostat. For other modes of operation, temperature may be controlled, e.g., programmed to increase or decrease, as by heat programmer 24 which may comprise a suitable rheostat or cam-switch combination driven by a motor M. Heat control switching means 21 provide the necessary switching to place lamp 20 under the control of programmer 24 or controller 22.

In the illustrated embodiment, the transverse vibrational mode of specimen 1 is excited by means of exciter coil 13 and cooperating ferrite magnetic element 13a attached to the driven end of the specimen.

The exciter coil 13 is driven from a sweep frequency system including motor M which is energized from power terminal P via switch $S_1$ and interconnected with a speed controller SC. The sweep frequency system also includes a frequency control network $N_1$ having manually adjustable capacitances $C_1$, $C_2$, $C_3$ and $C_4$. Capacitors $C_1$, $C_2$ and $C_3$ are also driven by the motor M through clutch $E_1$. The frequency corresponding to the positions of $C_1$, $C_2$, $C_3$ and $C_4$ is indicated by an indicator $I_1$ coupled to these elements. The indicator may be visually observed to position or reset $R_{41}$ and $C_1$, $C_2$ or $C_3$ for manual or automatic measurement. An oscillator-amplifier $V_1$ is connected to $N_1$ and operates at a frequency determined by the motor M and network. Driven by $V_1$ is an output amplifier $V_2$ which drives in turn the exciter coil 13. The latter may include in its circuit a temperature compensating network 13b.

Network $N_1$ with its tunable capacitors $C_1$, $C_2$ and $C_3$ is in the oscillatory feedback path between the input and output of amplifier $V_1$. The setting of the selected capacitor, e.g. $C_3$ in FIGURE 1, thus controls the oscillation produced at the output of $V_1$, which output is fed to output amplifier $V_2$.

In response to energization of coil 13, specimen 1 has vibratory motion induced therein. This motion causes movement of a ferrite magnet 14a fixed to the output end of the specimen; a related voltage is thus induced in associated sensing coil 14. The output of the latter is fed to an amplifier-detector circuit including a pre-amplifier $V_3$ and detector $D_1$ in cascade. The detector output is coupled by way of adjustable resistance $R_1$ to the input of a recorder and illustratively to the Y axis channel of a coordinate XY recorder, RK. The Y position servo of this recorder translates the detected output signal into an equivalent Y pen position which is conveniently plotted on graph G.

In addition to the functions provided by the recorder, monitoring and measurement of signal flow is available by way of an oscilloscope OS which in a phase measuring mode has its horizontal channel supplied by the energizing voltage of coil 13, i.e., the output of $V_2$, and its vertical channel energized by the specimen response as manifested at the output of $V_3$. By proper balancing of signal amplitudes and calibration of external phase shifts, the phase relationship between specimen driving force and specimen displacement will be indicated on OS whereby the loss angle $\phi$ and Q of the specimen are determinable. ($Q = \tan \phi$; however the value of $\phi$ in many cases justifies the assumption that $\phi = \tan \phi$). Oscilloscope OS is also adapted to display the amplitude-time response of the specimen by switching the horizontal channel to the sweep mode as by switch $S_2$. The amplitude-time response of the driving voltage may also be viewed in the sweep mode by actuating switch $S_3$. A sync signal is conveniently provided by the output of $V_1$.

For additional monitoring, a voltmeter VM is provided in the signal system, being selectively connected to the outputs of $V_2$, $V_3$ or $D_1$ by appropriate setting of switch $S_4$.

As noted above, one input to the Y channel of graphic recorder RK consists of the specimen response after amplification and detection. The inputs to the X axis channel may comprise a signal related to temperature or a time function signal, means being provided for applying either of these, or both in alternating succession.

Enclosure 12 includes a temperature responsive transducer embodied as a thermocouple 30 the output of which is connected to a temperature indicator 31 and to a circuit including the X channel of recorder RK and certain switching elements.

One side of thermocouple 30 is connected to terminal X–1 of the recorder while the other side connects to contact 34a of a switch 34. The movable contact 34c of the switch is periodically actuated by motor M via switch drive 35 which may include an appropriate gear train and cam assembly. Contact 34c thus alternately makes contact with 34a and 34b. The arm 34c is connected via contacts 35a and 35d of a selector switch 35' to the terminal X–2 of record RK. Hence, with switch 35' in the illustrated position, the output of thermocouple 30 is applied to the X channel servo of the recorder periodically, i.e., during those periods when motor M positions 34c in contacting relationship with 34a.

Also connected to terminal X–1 of the X channel is one side of a function generator embodied as the series combination of D.C. source $E_r$, a calibrating variable resistance $R_{40}$, and a variable resistance $R_{41}$ the arm of which is driven by motor M via clutch $E_2$. The other side of this generator is connected to contact 34b of switch 34. Hence, with switch 35' in the illustrated position, the X input to recorder RK is shared or multiplexed between a signal related to temperature (derived from the thermocouple) and a signal varying with time (derived from the function generator).

In lieu of the foregoing, either the temperature signal or the time signal may alone be applied to the recorder by placing switch arm 35d in the positions 35b or 35c.

Figure 2:
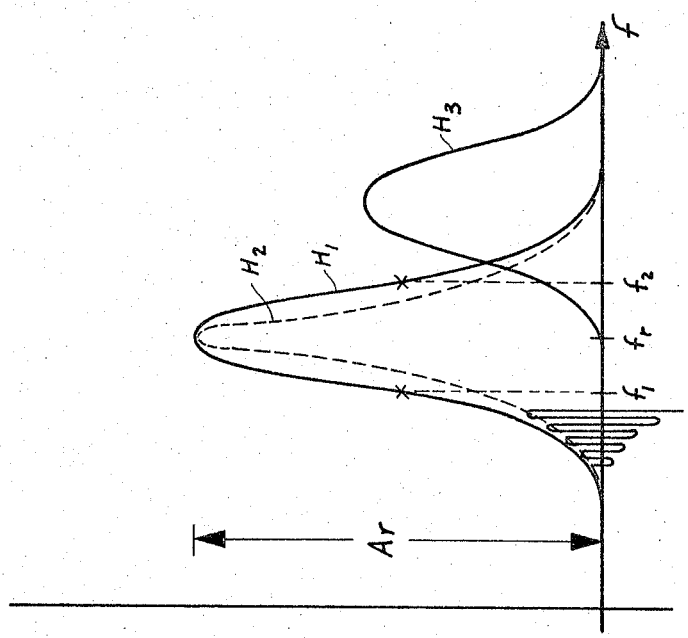
FIGURES 2, 2A, 3 and 5 are schematic representations of data variations relating to the system of FIGURE 1.

In the illustrated embodiment, the frequency of the exciting signal applied to specimen 1 via the sweep-frequency generator is varied, preferably in a linear manner by appropriate shaping of capacitances $C_1$, $C_2$ and $C_3$. By proper selection of frequency range, which is facilitated by switch $S_6$ and adjustment of capacitor $C_4$, motor M will vary the frequency of oscillator $N_1$, $V_1$, $V_2$ through the fundamental or harmonic range of the specimen 1. An exemplary detected response $H_1$ is illustrated in FIGURE 2.

As the frequency of the oscillator increases from some adjusted low value, a rise in the vibration amplitude of the specimen is observed. At frequency $f_1$, half the maximum or resonance amplitude $A_r$ is reached; at the resonant frequency $f_r$, full amplitude is achieved. Thereafter, increasing frequency results in a gradual decay in vibration amplitude; at frequency $f_2$, amplitude is at half the peak value; further increases produce the characteristic trailing edge of the response. For reference, a response of higher Q but same resonant frequency is shown in dashed lines at $H_2$ while a third response of differing amplitude, bandwidth, resonant frequency and Q is shown at $H_3$.

Figure 2A:
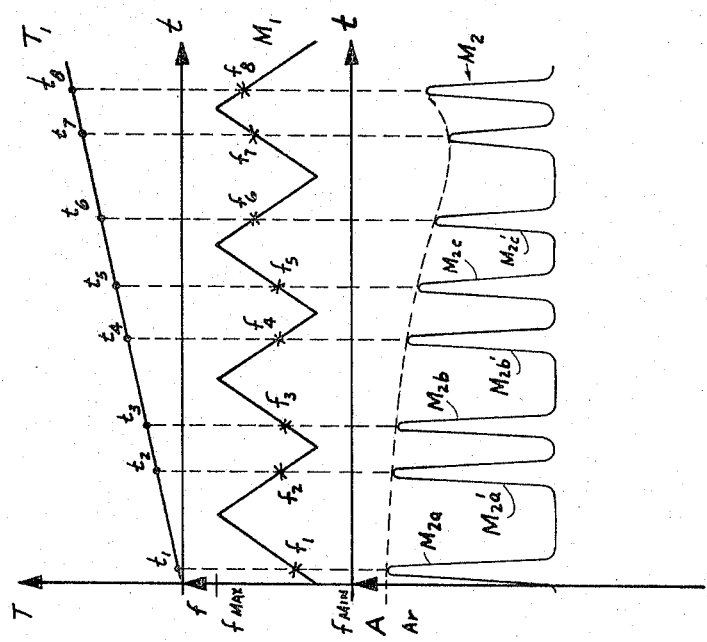

In the illustrated embodiment the sweep frequency system is cycled between the adjusted values of $f_{min}$ and $f_{max}$ as shown by plot $M_1$ in FIGURE 2A. During each cycle the frequency range is swept twice producing two responses $M_2$ per cycle. At a constant temperature the peak amplitudes $A_r$ should remain constant as should the resonant frequency and bandwidth. Q under these conditions is constant. A series of equal amplitude, evenly-spaced pairs of responses will appear on graph G of recorder RK if the X-servo input comprises a linear time varying voltage such as derived from the function generator. Frequency and bandwidth, and therefore Q, are simply ascertained by calibrating the X axis of graph G in terms of frequency.

If now, the specimen 1 is subject to a temperature variation then for various characteristics of the response will vary. For one, the amplitude of the response, $A_r$, will change with temperature as indicated at $M_2$ in FIGURE 2A. The envelope there shown illustrates an exemplary amplitude variation for a case of linearly increasing temperature such as shown at $T_1$ in FIGURE 2A.

In addition to amplitude changes, resonant frequency will change as shown at $M_1$ by the differing frequency points $f_1$, $f_2$, $f_3$ ... $f_g$. This is manifested at $M_2$ as a decreasing width between pairs of responses $M_{2a}$–$M_{2a'}$, $M_{2b}$–$M_{2b'}$, etc.

If the input to the X servo of the recorder comprises the previously mentioned linear time varying voltage, the response plotted on graph G will generally resemble $M_2$ of FIGURE 2A. (See also $A_r$, FIG. 3.) From this response various factors descriptive of the specimen can be determined. However, under these conditions the recorded response does not provide data indicative of temperature. One solution to this problem is to replace the time varying voltage obtained from the function generator with a voltage related to temperature. This is accomplished with switch 35' in the position 35b. If the temperature rise is approximately linear then the response on graph G will be as shown at $M_2$. The X axis may be readily calibrated in terms of temperature. The values of temperature relating to each response are therefore recorded and available for evaluating or analyzing the specimen.

Alternatively, the X axis of the recorder can be supplied with both temperature data and frequency data by multiplexing the X axis inputs with the aid of switching drive 35 and switch 34. During one period of time the X axis represents temperature while during successive time intervals it represents frequency. These conditions occur alternatively as motor M periodically actuates switch 34 through switching driver 35. The relative time intervals of the temperature input voltage and function generator input may be adjusted for a convenient display by switch drive 35. For example, the temperature voltage can be supplied to the recorder for the major periods of time with the function generator voltage being applied only briefly.

Figure 5:
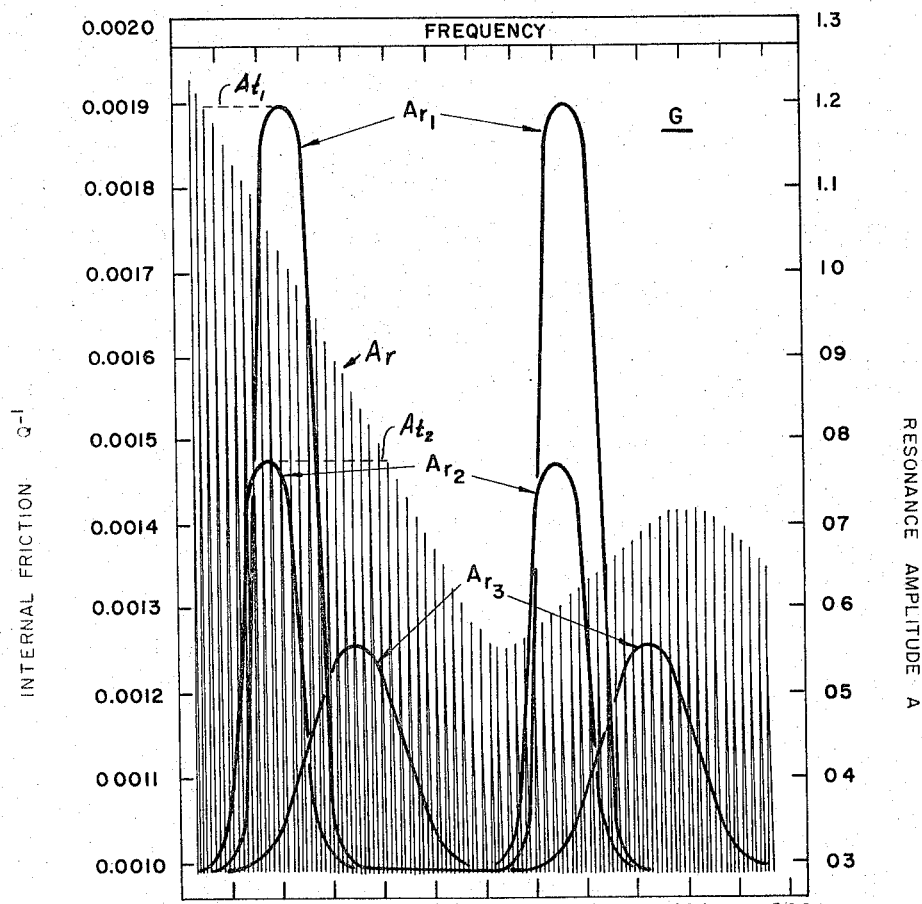

Thus, as seen in FIGURE 5, a plot $A_r$ of resonance amplitude as a function of temperature has superimposed thereon, plots $A_{r1}$, $A_{r2}$ and $A_{r3}$ of amplitude as a function of frequency. The temperature responses are recorded with arm 34c contacting 34a whereby the thermocouple voltage is applied to the X axis of the recorder. Periodically, switch drive 35 transfers 34c to 34b, whereby the time varying voltage derived from potentiometer $R_{41}$ driven by motor M is applied to the X axis causing a response such as $A_{r1}$. Calibration and synchronization of $R_{41}$ provides a convenient display which in the illustrated case provides approximately full deflection across the recorder graph for one cycle of the sweep frequency system. Hence, two resonance conditions are traced. Drive 35 then returns 34c to 34a and plotting of the temperature response resumes.

The frequency-calibrated responses $A_{r1}$, $A_{r2}$ and $A_{r3}$ may each be correlated with the applicable temperature by locating the particular temperature calibrated response which has the same amplitude. Note that $A_{t1}$ corresponds with $A_{r1}$, and $A_{t2}$ with $A_{r2}$.

With the foregoing data precise values of Q and values of change in E or other moduli can be determined. Since horizontal deflection of the graph G is proportional to temperature as represented by the thermocouple voltage, the temperature change need not be linear.

As an example of an operating run, the plot of FIGURE 5 may represent a temperature change from 20° C. to 250° C. over a time interval of 2 hours with interruptions every 20 minutes to record a frequency-calibrated response. The sweep frequency period may be two minutes whereby approximately 120 temperature-calibrated responses would be plotted. (A lesser number is shown in FIGURE 5; moreover, transient pen movements during switching have been omitted.)

The above described switching may also be manually accomplished with switch 35' and it should be understood that any desired particular display may be attained by suitable calibration.

Figure 3:
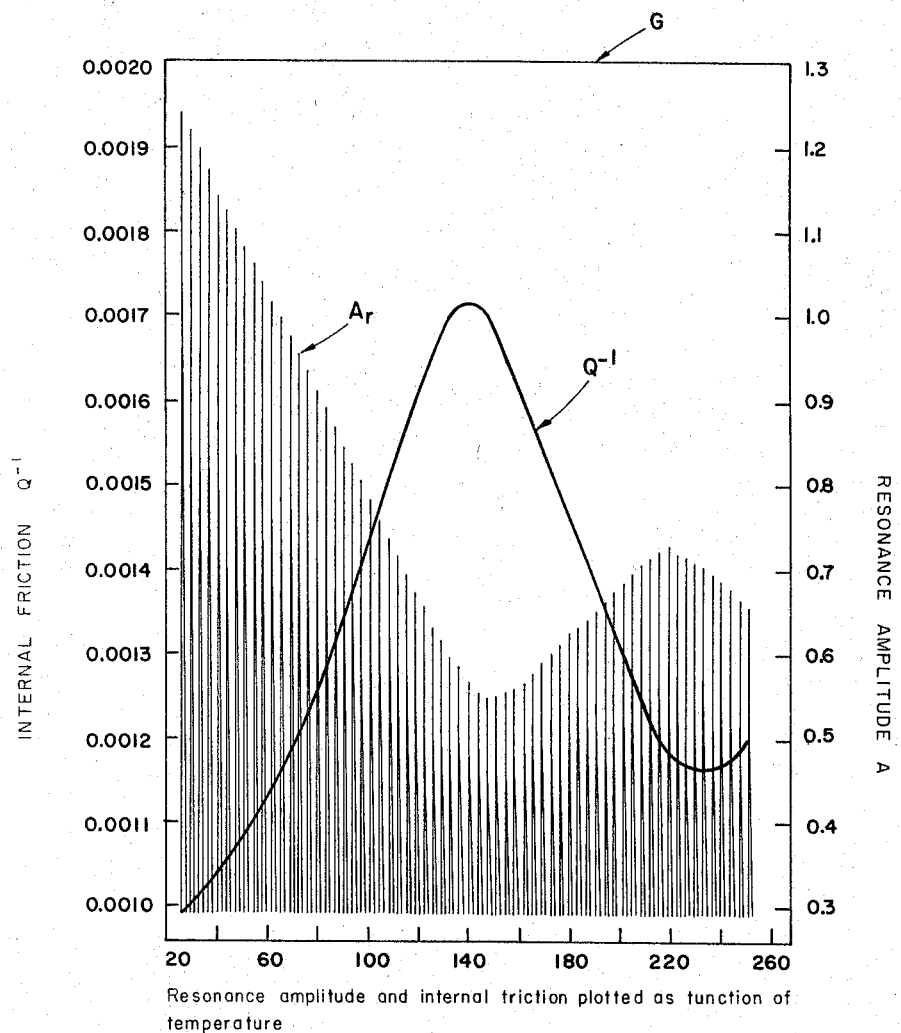

Another series of specimen responses plotted on graph G as a function of temperature is shown at $A_r$ in FIGURE 3. A curve $Q^{-1}$ is superimposed for reference. It has been found that in many cases, amplitude $A_r$ may be taken as a measure of Q, or $1/Q$, i.e. $A = kQ$ or $k/A = 1/Q$ where $k$ is a constant. It has also been found that the lack of proportionalty between A and Q which occurs in some cases, may be attributed to temperature induced variations in the specimen driving and pickup systems. A ferrite for example suffers appreciable flux loss as temperature rises while certain Alnico types are much less effected by temperature, even up to 600° C. Hence by introducing a temperature variable compensation in an appropriate part of the system, e.g., at 13b, FIGURE 1, this lack of proportionality can be automatically compensated.

Figure 4:
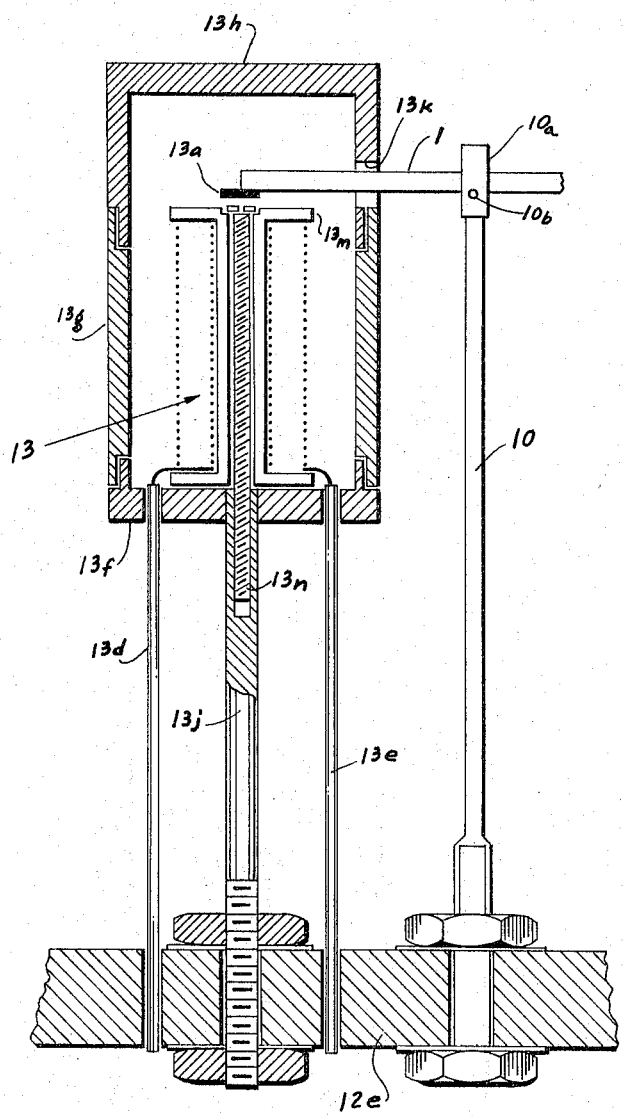
FIGURE 4 is a detailed elevational view partly in section of a component of the system of FIGURE 1.

Certain additional features are illustrated in FIGURES 1 and 4, it being understood that all components save the recorder RK, are preferably integrated in a common chassis-cabinet configuration. A common power supply is preferably included as indicated at "PWR" in FIGURE 1 for applying operating potentials for the various components such as $V_1$, $V_2$, $V_3$; the oscilloscope OS is provided with a separate source in view of its unique power requirements.

Referring back to FIGURE 1 it may be noted that the enclosure 12 includes a doubled-wall casing, 12a, 12c separated by suitable insulation material 12b such as rockwool. The casing is releasably mounted on a base 12e having a layer 12f, of insulating material. The interior of the enclosure is lined with a reflective material 12d such as aluminum foil.

Further structural features of the enclosure components are illusrtated in FIGURE 4. As seen therein coil 13 is supported on base member 12e via a strut 13j which is secured as by bolting to the enclosure base. A casing for covering coil 13 is provided in the form of a sleeve 13g which telescopes over base 13f, and a cap 13h which is in telescoping relationship with sleeve 13g. Cap 13h includes an aperture 13k whereby specimen 1 is disposed above the coil armature. The housing of 13f, 13g and 13h, is preferably of iron while the coil spool 13m is illustratively of ceramic material. The coil core is conveniently embodied as an iron screw 13n. The coil windings are energized via lead-in wires 13d and 13e.

The specimen support 10 includes a cradle 10a having a fiber 10b at the upper end of the support. The specimen 1 is coupled to the support 10 by this arrangement while the support is secured as by bolting to the base 12e of the enclosure.

In addition to bars or rods, specimens may be glass bottles or metal castings or even structural members in situ. Various modes of vibrations exciting within a specimen such as flexural, longitudinal and torsional may be excited. Moreover the transducer may use acoustic columns of air instead of magnetic coupling. The magnetic coils may be outside the environmental chamber or oven and coupled to the specimen by rods or wires at the nodal points; the sample may be suspended at the point of maximum amplitude. Instead of temperature, the environmental parameters may be other factors such as humidity, magnetic or nuclear flux. Means other than the function generator may also be employed for supplying a frequency indicating signal.

The invention is not limited to the specific mechanisms shown and described but departures may be made therefor within the scope of the accompanying claims without departing from the principles of the invention and without sacrificing its chief advantage.

What is claimed is:

1. A system for subjecting solid materials to controlled vibratory energy under controlled environment and for sensing and indicating the response thereto, comprising an environment controlled enclosure adapted to contain a specimen of said solid material, driving transducer means for imparting vibratory energy thereto, means for controlling the temperature of said enclosure including control means for establishing and adjusting predetermined temperature in said enclosure, temperature responsive means for sensing the temperature of said enclosure and deriving a signal related thereto, specimen motion sensing means, sweep frequency means coupled to said driving transducer means and including cyclic means for cyclically driving said sweep frequency means, detecting means responsive to the output of said motion sensing means, signal deriving means coupled to said sweep frequency means for deriving a signal related to the frequency of said sweep frequency means, graphic indicating means for indicating the response of said frequency relative to another variable and having a plurality of inputs, one input being responsive to the output of said detecting means and switching means having inputs operatively coupled to said signal deriving means and to said temperature responsive means and an output coupled to another input of said graphic indicating means, said switching means having means for selectively applying one or both successively of said switching inputs to said switching output for selectively displaying one or both successively of said frequency and temperature signals on said graphic indicating means.

2. A system according to claim 1 in which said sweep frequency signal deriving means comprises function generating means interconnecting said sweep frequency means and said switching means.

3. A system according to claim 1 in which said graphic indicating means comprise a two-channel recorder having said switching means output connected to one channel and said detecting means coupled to said other channel.

4. A system as defined in claim 1 in which said enclosure includes radiant heat generating means controlled by said temperature control means.

5. A system as defined in claim 1 in which said sweep frequency means includes means for generating a plurality of predetermined ranges of frequencies and selecting means for selecting one of said ranges.

6. An integrated automatic system for subjecting a solid specimen to controlled vibratory and thermal energy and for indicating the response thereto comprising a thermally controlled enclosure adapted to contain said specimen and having thermal electric means for maintaining adjustable predetermined temperatures therein, transducer means responsive to thermal conditions of said enclosure, variable frequency specimen excitation means for imparting resonance vibration to said specimen, sensing means responsive to the vibration of said specimen, frequency responsive signalling means responsive to said excitation means, and plural-variable response indicating means having one channel connected to be responsive to said sensing means and another channel connected to be selectively responsive to said temperature transducer means and to said frequency responsive signalling means.

7. A system according to claim 6 including programming means in said thermal electric means and a heat source controlled thereby and in thermal relationship with said enclosure for causing the temperature of said speciment to increase with time.

8. A system according to claim 7 in which said variable frequency specimen excitation means comprise a cyclically operated sweep frequency generator for periodically resonating said specimen and said frequency responsive signalling means comprise function generating means having voltage varying means for supplying to said indicating means a voltage indicative of the frequency of said sweep frequency generator.

9. A system according to claim 8 in which said heat source comprises an incandescent lamp within said enclosure, said transducer means comprise a thermocouple, and said indicating means comprise an X–Y recorder.

10. A system according to claim 1 in which said environment controlled enclosure includes a heat source controlled by said thermostatic switch means, the latter being connected thereto to hold said enclosure at a predetermined adjustable temperature.

11. A system according to claim 1 including programming means operatively connected to said temperature control means for controllably programming the temperature of said enclosure.

12. A system according to claim 11 in which said programming means are connected to be controlled by said sweep frequency means.

13. A system according to claim 1 in which said cyclic means comprise motor means and said frequency signal deriving means comprise variable resistance means actuated by said motor means.

References Cited by the Examiner
UNITED STATES PATENTS

| | | | |
|---|---|---|---|
| 2,240,722 | 5/1941 | Snow | 346—29 X |
| 2,377,349 | 5/1945 | MacKenzie | 73—67 |
| 3,161,456 | 12/1964 | Perlaky | 346—62 |

OTHER REFERENCES

Crissman, J. M., et al., Apparatus for Measuring the Dynamic Mechanical Properties of Polymeric Materials Between 4° and 300° K. In The Journal of the Acoustical Society of America, 34 (No. 11), pages 1703–1706, November 1962.

Stokes, H. J., Apparatus for the Measurement of Young's Modulus Between 200 and 700° C. by Transverse Vibration in Vacuum. In Journal of Scientific Instruments, 37, pages 117–119, April 1960.

Fine, M. E., Apparatus for Precise Determination of Dynamic Young's Modulus and Internal Friction at Elevated Temperatures. In the Review of Scientific Instruments, 28 (8), pages 643–645, August 1957.

Siefert, A. V. et al., The Role of Tetragonal Twins in the Internal Friction of Cooper Manganese Alloys. In Journal of Applied Physics 22 (10), pages 1257–1259, October 1951.

Kline, Donald E., A Recording Apparatus for Measuring the Dynamic Mechanical Properties of Polymers, Journal of Polymer Science, vol. 22, No. 102, December 1956, pages 449–454.

RICHARD C. QUEISSER, *Primary Examiner.*

J. P. BEAUCHAMP, *Assistant Examiner.*